UNITED STATES PATENT OFFICE.

JOHANN MINDER, OF MOSCOW, RUSSIA.

PROCESS OF PREPARING COATINGS OF INDIA-RUBBER ON SURFACES OF WATERPROOF BED-SHEETS.

SPECIFICATION forming part of Letters Patent No. 652,322, dated June 26, 1900.

Application filed January 24, 1900. Serial No. 2,670. (No specimens.)

*To all whom it may concern:*

Be it known that I, JOHANN MINDER, a subject of the German Emperor, residing at Moscow, in the Empire of Russia, have invented new and useful Improvements in Processes of Preparing Coatings of India-Rubber on Surfaces of Waterproof Bed-Sheets, of which the following is a specification.

The india-rubber-coated bed-sheet materials heretofore used are not only stiff and hard, but are also, on account of the fine pores of the india-rubber coating, especially difficult to disinfect, and require, therefore, the greatest care in using them in cases of illness.

The improvement which forms the subject of the present invention consists in a process which entirely gets over this difficulty in the india-rubber coating, so that by it a soft completely-impervious material for bed-sheets is obtained, capable also of resisting acids and alkalies.

The new process consists, essentially, in adding heavy hydrocarbon oil—such as mineral oil, tar-oil, ozokerite or paraffin—to the usual mixture of india-rubber, dyeing, and other material before the solution in benzin or benzol and after the usual processes of coating, drying, and vulcanizing passing the material through a solution of heavier hydrocarbon oil in benzin or benzol and then drying it.

The addition of heavy hydrocarbon to the mixture of india-rubber and other material and coloring-matter in the proportion of about one-fifteenth to one-twentieth of the weight of the latter considerably facilitates the mixture of the materials and surrounds the molecules of the india-rubber after the solution of the mixture in benzin or benzol with a completely-neutral coating unaffected by chemical influence.

The object of the treatment of the vulcanized coating with a solution of heavy hydrocarbon in benzin or benzol in the proportion of about one to twelve is to get rid of the very fine pores in the coating and at the same time to make the coating and also the bed-sheet prepared with it as described soft and pliant. It is also insured in this way that no micro-organism shall remain present in the material.

What I claim as my invention, and desire to secure by Letters Patent, is—

A process for the preparation of an india-rubber coating for the material for bed-sheets, consisting in adding heavy hydrocarbon to the mixture of india-rubber, coloring and other usual materials, before the solution in benzin or benzol, and after vulcanizing this coating, passing it through a solution of heavy hydrocarbon in benzin or benzol, and then drying it, substantially as described.

In testimony whereof I have hereunto set my hand in presence of two witnesses.

JOHANN MINDER.

Witnesses:
   B. MINDER,
   T. BAUER.